Patented Oct. 9, 1934

1,976,412

UNITED STATES PATENT OFFICE 1,976,412

TREATMENT OF POULTRY

Levi Scott Paddock, Chicago, Ill., assignor to Industrial Patents Corporation, Chicago, Ill., a corporation of Delaware No Drawing. Application June 7, 1934, Serial No. 729,445

3 Claims. (Cl. 17—45)

This invention relates to improvements in methods of dressing poultry.

One of the objects of this invention is to provide a method for removing feathers from poultry.

Another object of this invention is to provide a method whereby the feathers may be removed from the breasts of ducklings without damage to the skin.

Other objects of the invention will be apparent from the description and claims which follow.

Large quantities of poultry are treated with depilating waxes such for example as described in the patent to Rosenberger, No. 1,727,674. Difficulty has been experienced particularly with younger birds and more particularly with ducklings due to the tearing of the skin upon the removal of the defeathering wax which is applied to the bird after it has been roughed, that is, after the larger feathers have been removed.

Defeathering wax in ordinary practice is applied while hot and allowed to congeal by cooling. It is then removed taking with it any feathers remaining on the bird since the waxy coating adheres to the dermal excrescences.

The breast skin of ducklings is particularly tender and is often torn with the removal of the depilatory. I have discovered that this difficulty may be overcome by applying a light oil such as paraffin oil to the bird to prevent adherence of the adhesive to the skin.

In practice I have used numerous mineral oil products from very thin oils up to low melting point petroleum jellies.

I have very successfully used an egg dipping oil having a specific gravity of 0.853. The oil may be applied to the bird in any manner which will leave a thin film on the skin.

A simple and satisfactory manner of application is with an atomizer. After application of the oil, the bird may be dipped in or sprayed with the depilating wax in the usual manner and the congealed wax may be removed in the usual manner, without damage to the skin of the bird.

I claim:

1. The method of defeathering poultry which comprises applying an oleaginous substance to the skin, thereafter applying a depilating wax and removing feathers with the wax.

2. In the defeathering of poultry the step which comprises applying an oleaginous substance to the skin of the bird before the application of defeathering adhesive.

3. In the defeathering of ducklings, the step which comprises applying a thin oil to the breast of the bird before the application of defeathering adhesive.

LEVI SCOTT PADDOCK.